United States Patent
Strawn et al.

(10) Patent No.: US 7,598,956 B2
(45) Date of Patent: Oct. 6, 2009

(54) BLENDED OBJECT ATTRIBUTE KEYFRAMING MODEL

(75) Inventors: Devon L. Strawn, Seattle, WA (US); Kenneth Lawrence Young, Sammamish, WA (US); Kurt B. Jacob, Redmond, WA (US); Patrick G. Mullen, Bellevue, WA (US); Peter Faraday, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 192 days.

(21) Appl. No.: 10/825,035

(22) Filed: Apr. 15, 2004

(65) Prior Publication Data

US 2005/0232587 A1    Oct. 20, 2005

(51) Int. Cl.
*G06T 13/00* (2006.01)
(52) U.S. Cl. ...................................... 345/473
(58) Field of Classification Search ........................ None
See application file for complete search history.

(56) References Cited

U.S. PATENT DOCUMENTS

| | | | | |
|---|---|---|---|---|
| 5,682,326 | A | 10/1997 | Klingler et al. | 715/500.1 |
| 5,886,710 | A * | 3/1999 | Snibbe | 345/473 |
| 6,011,562 | A | 1/2000 | Gagne et al. | 345/473 |
| 6,064,393 | A * | 5/2000 | Lengyel et al. | 345/427 |
| 6,144,385 | A | 11/2000 | Girard | 345/424 |
| 6,392,710 | B1 | 5/2002 | Gonsalves et al. | 348/578 |
| 6,686,918 | B1 | 2/2004 | Cajolet et al. | 345/473 |
| 7,055,100 | B2 | 5/2006 | Moriwake et al. | 715/723 |
| 2002/0118875 | A1 * | 8/2002 | Wilensky | 382/173 |
| 2004/0834481 | | 4/2004 | Shultz et al. | 719/312 |

FOREIGN PATENT DOCUMENTS

GB    2 323 991    10/1998
WO   WO 00/36509    6/2000

OTHER PUBLICATIONS

Adobe LiveMotion 1.0.2, Nov. 19, 2002, http://www.sonic.net/mnitepub/pccafe/reviews/adobe_livemotion/adobe_livemotion.html, pp. 1-7.
Skyrme, T., Full Product Review Adobe LiveMotion, Dec. 19, 2002, http://graphicssoft.about.com/library/reviews/ucts_fpr_livemotion1a.htm, pp. 1-9.

(Continued)

Primary Examiner—Xiao M Wu
Assistant Examiner—Said Broome
(74) Attorney, Agent, or Firm—Woodcock Washburn LLP (57) ABSTRACT

Combined object level and property level key framing systems, methods, and user interfaces are provided in which a user can enter a mode where any change to a property is recorded as a key framing action (e.g., creation or edit) at the current time as indicated by a timeline. When a key frame is created in this mode, the surrounding object level key frames are inspected to ensure that the functionality that users expect from object level key frames is maintained. If a user explicitly creates an animation of an attribute that spans an object level key frame, then that span for the animation is maintained as the user edits.

9 Claims, 10 Drawing Sheets

OTHER PUBLICATIONS

Graphics Software Archived Features for 2002, about.com: Graphics Software, http://graphicssoft.about.com/library/weekly/mprev02.htm, pp. 1-5.*

Skyrme, T., Full Product Review Adobe LiveMotion, Feb. 20, 2002, http://graphicssoft.about.com/library/reviews/ucts_fpr_livemotion1a.htm, pp. 1-9.*

Fishwick, Paul A., et al., "Using Discrete Event Modeling For Effective Computer Animation Control," *Proceedings of the 23rd conference on Winter simulation*, Dec, 1991, pp. 1156-1164.

Friedrich, Axel, et al., "Interpolation of Triangle Hierarchies," *Proceedings of the conference on Visualization '98*, Oct. 1998, pp. 391-396 and 554.

Gleicher, Michael, et al., "Snap-Together Motion: Assembling Run-Time Animations," *Proceedings of the 2003 symposium on Interactive 3D graphics*, Apr. 2003, pp. 181-188.

Reeves, William T., "Inbetweening for computer Animation Utilizing Moving Point Constraints," *ACM SIGGRAPH Computer Graphics, Proceedings of the 8th annual conference on Computer graphics and interactive techniques*, vol. 15, Issue 3, Aug. 1981, pp. 263-269.

Steketee, Scott N., et al., "Parametric Keyframe Interpolation Incorporating Kinetic Adjustment and Phrasing Control," *ACM SIGGRAPH Computer Graphics, Proceedings of the 12th annual conference on Computer graphics and interactive techniques*, vol. 19, Issue 3, Jul. 1985, pp. 255-262.

Bryce Tutorial-Keyframe Animation, http://web.archive.org/web/20031212001322/http://cadtutor.net/dd/bryce/anim/anim, Dec. 12, 2003, 13 pages.

Barham, P. et al., "Xen and the Art of Vitualization," *Proceedings of the ACM Symposium on Operating Systems Priciples*, Oct. 2003, 164-177.

Bugnion, E. et al., "Disco: Running Commodity Operating Systems on Scalable Multiproce3ssors," *ACM Transactions on Computer Systems, ACM*, Nov. 1997, 15(4), 412-431.

Watson, D., "Keyframe Animation", http://web.archive.org/web/20040206035404/http://cadtutor.net/dd/bryce/anim/anim.html, 13 pages (Archived Feb. 6, 2004).

* cited by examiner

BLENDED OBJECT ATTRIBUTE KEYFRAMING MODEL

FIELD OF THE INVENTION

This invention relates in general to the field of computer graphics. More particularly, this invention relates to animation authoring tools.

BACKGROUND OF THE INVENTION

The industry standard for animation authoring tools uses a key frame, which is defined as a point in time, and a set of property changes that occur at that point in time. The properties can be anything from the color of an object to the entire contents of the scene, for example. Some tools, such as Macromedia Flash, represent key frames at the layer level and store the entire state of all objects in the layer at that point in time. Other tools, such as Adobe Live Motion, represent key frames on the attributes of an object, so that an indicator is stored on every property of an object which tells whether or not the property is animated. Both approaches have several drawbacks.

A drawback of representing key frames at the layer level and storing the entire state of all objects in the layer at that point in time is that it is difficult for the user to determine from the user interface which properties are being animated on any particular object. Another drawback of this approach is that it is very difficult for the user to animate the value of a property across one of these key frames. For example, if the user wants the value of the color of an object to change from red to blue starting at 1 second, and ending at 3 seconds, he could do this by setting up a key frame at 1 second containing the color red and a key frame at 3 seconds containing the color blue. If the user then wanted to start the object moving at time 2, he could do this by setting a key frame at time 2. However, because of the key frame model, this key frame would also contain the value of the color at time 2. If the user ever changed the time value of this key frame, the color animation would change as well. There is no way for the user to resolve this other than by manually resetting the color value stored in that key frame so that a smooth interpolation from red to blue is restored.

The approach of representing key frames only on the attributes of an object has a drawback of, that in order to animate any property on an object, the user must search through a list of all properties on the object, and set the switch that makes that property animated, allowing key frames to be stored for that property. Furthermore, this approach requires the user to select or click a button on each property that he desires to animate. This can be cumbersome when trying to author an animation. Moreover, using this approach it is difficult to quickly determine at what times particular properties of an object are being animated, if the user cannot see all of the properties for the element on screen.

Many of the 2d animation tools currently on the market (Flash, After Effects, etc.) have animation as their primary mode of authoring. That is, most of the time that the user is interacting with the tool, he is working on an animation. However, as a tool whose primary task is user interface design, it is more desirable to allow the user to interact with the scene without having to think about animation. For instance, a user may keyframe a wiggle animation on a button which he has placed on his form, and then decide that the button is not in the correct position on the form. It would be desirable for the user to be able to do this without modifying all of the key frames in the wiggle animation. In other 2d tools, the user has to be constantly aware of where the current time marker is in the timeline used in the designing or authoring (and in some tools whether or not the property being edited can be keyframed).

In view of the foregoing, there is a need for systems and methods that overcome the limitations and drawbacks of the prior art.

SUMMARY OF THE INVENTION

The present invention is directed to combined object level and property level key framing systems, methods, and user interfaces. A user can enter a mode where any change to a property is recorded as a key framing action (e.g., creation or edit) at the current time as indicated by the timeline. When a key frame is created in this mode, the surrounding object level key frames are inspected to ensure that the functionality that users expect from object level key frames is maintained. If a user explicitly creates an animation of an attribute that spans an object level key frame, then that span for the animation is maintained as the user edits.

Exemplary embodiments include a method of keyframing an object in which at least one property and a time for the object are identified. As set forth further below, e.g., with respect to FIGS. 1-3, an attribute key frame is a key frame at the attribute level and a compound key frame is a key frame at the object level. A compound key frame can be thought of as essentially a placeholder for a "virtual attribute key frame" on all possible attributes. Other attribute key frames force this virtual attribute key frame to manifest itself on those attributes, as set forth below.

A first compound key frame is created at a first time, and then a second time is received for the object, e.g., by moving a playhead in a timeline element. Another compound key frame is created at the second time. Additional times for the object may be received, followed by creation of associated compound key frames at each of the additional times. A change to the property or properties may be received prior to creating the second compound key frame, in which case the second compound key frame incorporates the changes. Additionally, an attribute key frame may be created responsive to the received property change(s) if no attribute key frame exists for the property or properties at the time the received change is received. Alternately, an existing attribute key frame may be changed responsive to the received property change(s) if the existing attribute key frame exists at the time the received change(s) is received.

According to additional embodiments, an object may be keyframed by receiving a value for an attribute for the object at a first time, and then, if an attribute key frame corresponding to the attribute exists at the first time, amending the attribute key frame responsive to the received value for the attribute; otherwise, populating a neighboring object key frame (also referred to herein as a compound key frame) with an attribute key frame if an object key frame exists.

Populating the neighboring object key frame may comprise (1) if the neighboring object key frame exists later in time than the first time, and an attribute key frame exists later in time than the first time, then setting a first value to the value of the attribute key frame that exists later in time than the first time; or (2) if the neighboring object key frame that exists later in time than the first time, and an attribute key frame does not exist later in time than the first time, then setting the first value to the value of the originally received value for the attribute; and creating a new attribute key frame at the neighboring object key frame using the first value.

Additionally, populating the neighboring object key frame may comprise (1) if the object key that exists is earlier in time than the first time, and an attribute key frame exists earlier in time than the first time, then setting a first value to the value of the attribute key frame that exists earlier in time than the first time; or (2) if the object key that exists is earlier in time than the first time, and an attribute key frame does not exist earlier in time than the first time, then setting the first value to the value of the originally received value for the attribute; and creating a new attribute key frame at the neighboring object key frame using the first value.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

The present invention is directed to combined object level and property level key framing systems, methods, and user interfaces. A exemplary key frame in accordance with the present invention comprises the geometry and property values of an object at a particular time, and can be created against an individual object. Such a key frame can be shown when an object is animated at a particular time. A user can enter a mode in which any change to a property (also referred to herein as an attribute) is recorded as a keyframing action, such as creation or edit, at the current time as indicated by, or on, a timeline element. When a key frame is created in this mode, the surrounding object level key frames are inspected to ensure that the functionality that users expect from object level key frames is maintained. If a user explicitly creates an animation of an attribute that spans an object level key frame, then that span for the animation is maintained as the user edits.

Figure 1:
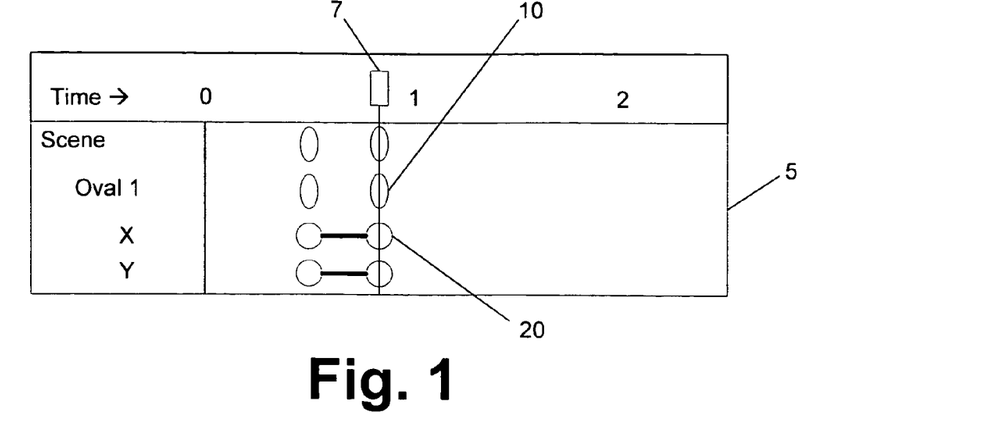
FIG. 1 is a diagram of an exemplary timeline element with playhead in accordance with the present invention.

An exemplary key frame authoring user interface (UI) is shown in FIG. 1, and comprises a compound key frame 10 and an attribute key frame 20. The exemplary key frame authoring UI timeline element 5 represents key frames at the object level (called compound key frames) and at the attribute level (called attribute key frames), and leverages both models of key framing to make the creation of key framed animations more efficient. A playhead 7 is provided that can be moved to a particular time to set properties, key frames, etc.

When a new attribute key frame 20 is created, it is represented at the object level with compound (or object level) key frame 10 on the time line. Object level key frames can be created explicitly which, given the behavior for adding key frames described below, will effectively represent the entire state of the attributes on an object at that point in time without actually creating attribute key frames for each one of those attributes at that time. For instance, if the user selects an object in the scene, and then selects a "new key frame" button (or actuates or selects a substantially similar feature), then a new object level key frame is created at the current time. As new attribute key frames are added in the regions of time adjacent to that compound key frame, it is populated with attribute key frames to maintain the state of the object at that time.

Figure 2:
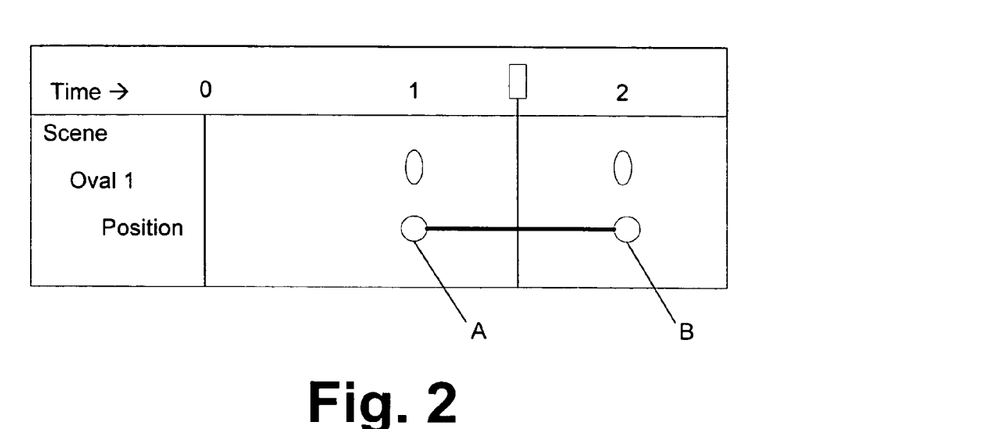
FIG. 2 is a diagram of an exemplary timeline element in accordance with the present invention.

As a user adds key frames to the animation, object level key frames are used to determine the span of newly animated attributes. Consider the scenario in which a user has authored an animation that moves an object from a position of (10,10) to a position of (100,100) from time 1 to time 2. Such an exemplary timeline element (which may be provided or displayed as part of a UI) is shown in FIG. 2, in which the object "oval 1" is set to move from a first position A (assume A corresponds to underlying position (10,10)) to a second position B (assume position B corresponds to underlying position (100,100)). So at time 1, an object level key frame is generated for the beginning, and at time 2, an object level key frame is generated for the end.

Figure 3:
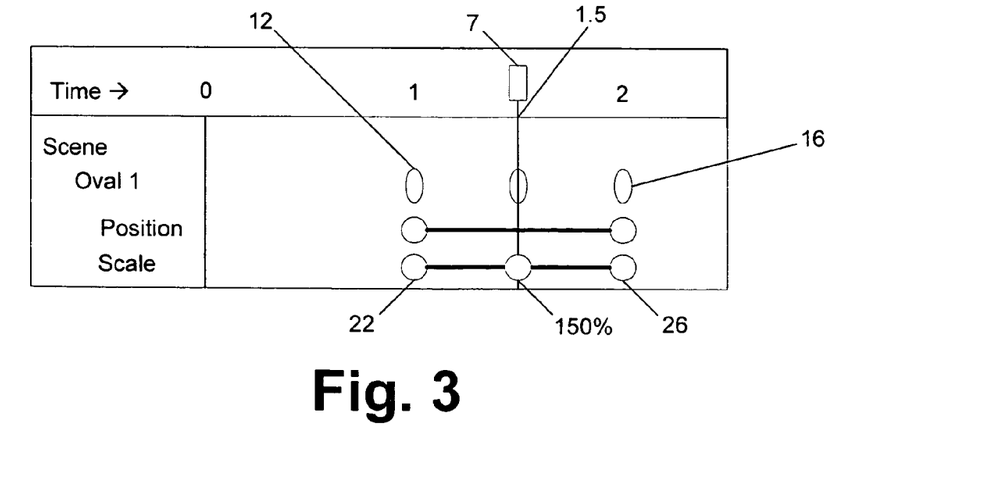
FIG. 3 is a diagram of another exemplary timeline element showing exemplary keyframing in accordance with the present invention.
Figure 4:
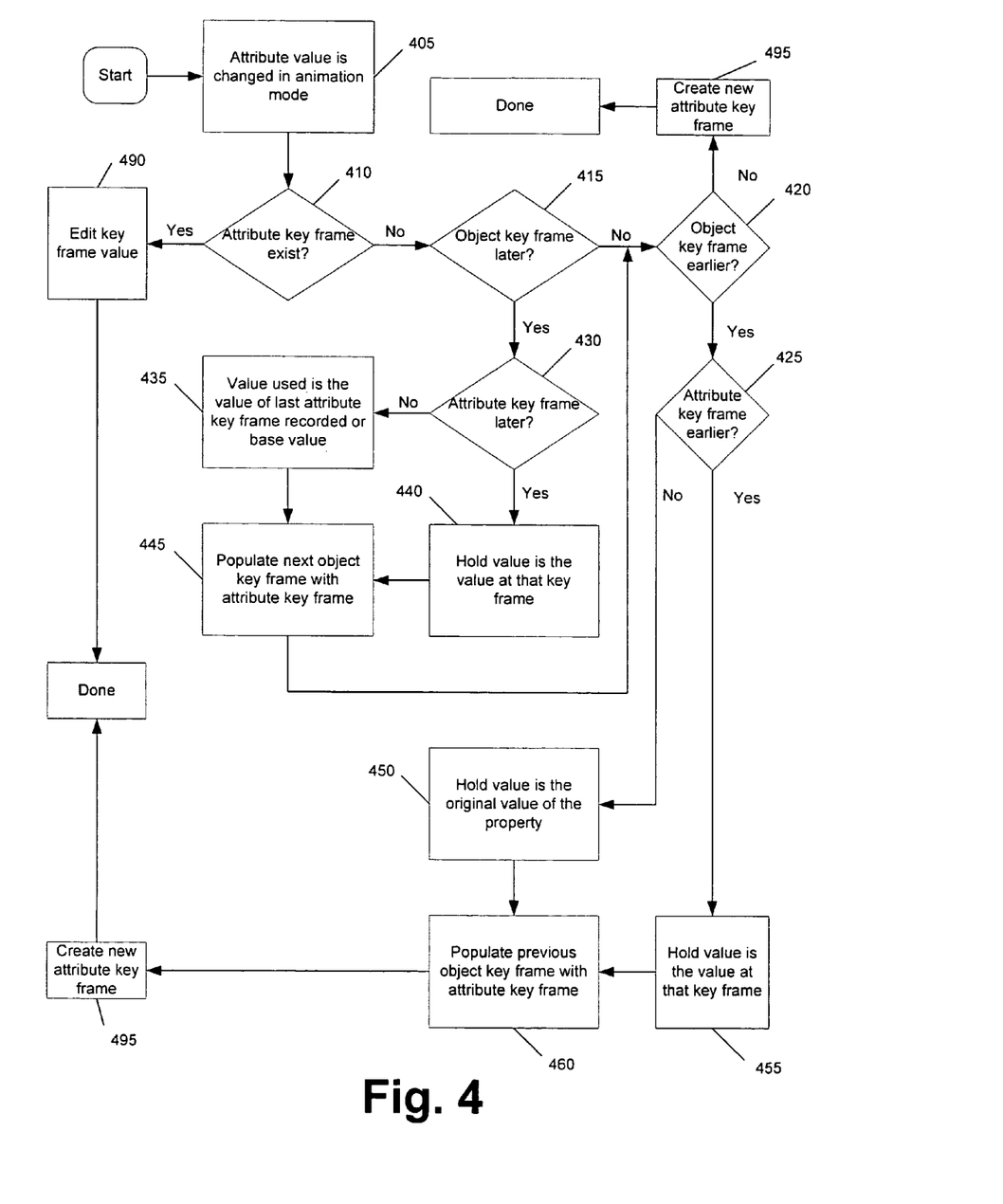
FIG. 4 is a flow chart of an exemplary method of keyframing in accordance with the present invention.

Now assume the user wants the object to scale up to 150% of its original size, and back down to its original size over the course of the movement from time 1 to time 2. In accordance with the present invention, this can be accomplished by moving the current time marker (i.e., the playhead 7) to time 1.5, as shown in FIG. 3, making sure that the timeline element is recording changes, and changing the value of the scale property to 150% at that point in time. In other words, at time 1.5, the scale is changed, and an object level snapshot is created. A population process, such as that described with respect to FIG. 4, is then used to determine the property (attribute) key frames at the current time (time 1.5) at the adjacent object levels (the ones directly previous and after (here, time 1 and time 2). Conventional interpolation algorithms may be used.

More particularly, when the user makes this change as shown in FIG. 3, the compound key frame that exists before this newly created key frame (here, element 12 at time 1) is examined, along with the compound key frame immediately following the newly created key frame in time (here, element 16 at time 2). If either or both of these key frames do not have attribute key frames for the scale of the object, then the appropriate values for scale is filled in for those key frames. In this scenario, attribute key frames 22, 26, respectively, for a value of 100% scale would be created under the previous compound key frame 12, and underneath the next compound key frame 16, as shown in FIG. 3.

Logic for the above described exemplary process is described in more detail with respect to the flow chart of FIG. 4. In FIG. 4, the neighboring object level key frames are inspected and populated. When a new key frame is added, a walk backward and forward is conducted. If an attribute key frame does not exist, nor does an object key frame exist (both earlier in time and later in time), then a new attribute key frame is created, which causes the creation of an object level key frame.

More particularly, at step 405, an attribute value is changed in the animation mode. It is determined at step 410 whether an attribute key frame exists at the current time. If so, then the key frame value is amended at step 490, and the process completes. If, however, an attribute key frame does not exist at the current time, it is determined whether an object key frame exists later than the current time, at step 415.

If an object key frame does not exist later in time at step 415, then it is determined at step 420 whether an object key frame exists earlier than the current time. If not, then a new attribute key frame is created for the current time at step 495, but if an object key frame does exist earlier than the current time, then it is determined at step 425 if there is an attribute key frame for this attribute earlier than the current time. If there is an attribute key frame for this attribute earlier than the current time, then the value at that key frame is maintained at that key frame, at step 455. If there is no attribute key frame for this attribute earlier than the current time, then the original value of the property is maintained as the value, at step 450. In either case, after step 450 or step 455, the earlier object key frame is populated with the key frame containing the value of the held or maintained value from step 450 or step 455, at step 460. Processing then continues at step 495 with a new attribute key frame being created for the current time. It is noted that in the case when the current time is time=0, then there is no need to look earlier in time, because time=0 is taken to be the smallest possible time value.

If, from step 415, it is determined that an object key frame exists later than the current time, then, at step 430, it is determined whether there is an attribute key frame for this attribute that exists later than the current time. If there is an attribute key frame for this attribute later than the current time, then the value at that key frame is maintained at that key frame, at step 440. If there is no attribute key frame for this attribute later than the current time, then the value used is the value of the last attribute key frame recorded or a base value (which may be predetermined) if none exists, at step 435. In either case, after step 435 or step 440, the later object key frame is populated with the key frame containing the value of the held or maintained value from step 435 or step 440, at step 445. Processing then continues at step 420, as set forth above.

The exemplary key frame population method described above with respect to FIG. 4 occurs on the creation of a new key frame. When the current time marker is over an existing attribute key frame, and that attribute is modified while keyframing is enabled, then the value of the key frame at that time is modified. This allows the system to maintain time spans explicitly created by the user. For example, if the user explicitly views the attributes of an object and deletes an attribute key frame that is between two other attribute key frames, then that time span will be maintained if either of the attribute key frames bounding the time span is modified.

The exemplary method for recording the values at key frames allows the system to specify a mode of interaction where all edits made by the user to any property automatically generates animation key frames. This mode can be entered, for example, by a user pressing a toggle button which toggles the key frame mode. This mode makes the quick creation of a large number of key frames possible in a short period of time. The number of clicks or other input required by the user is significantly reduced over other keyframing interfaces.

Figure 5:
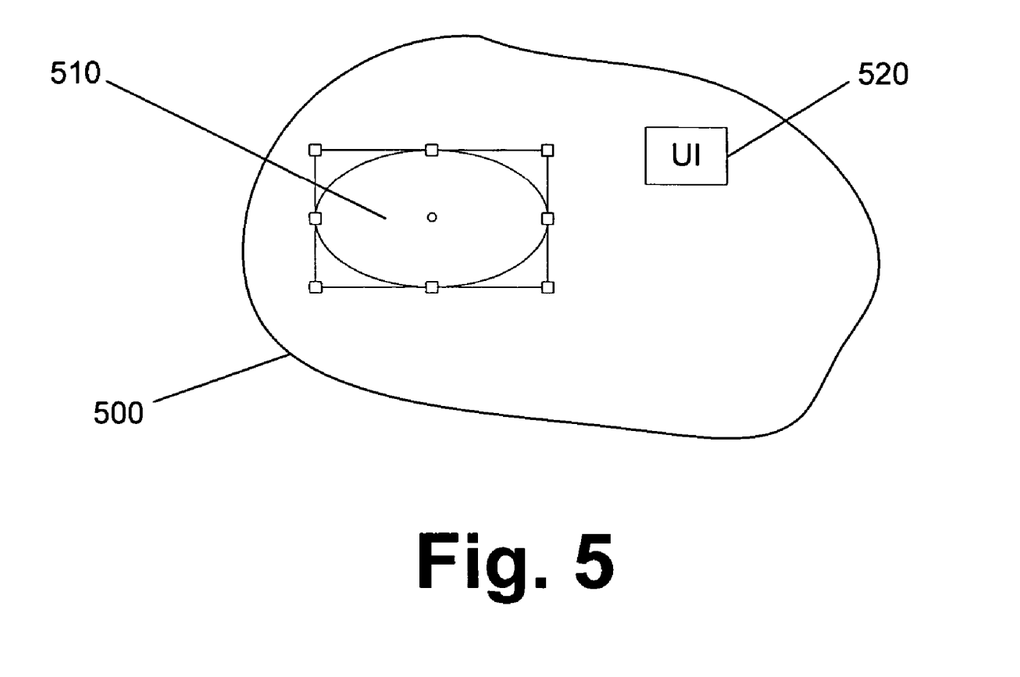
FIG. 5 is a diagram of an exemplary object in a scene with user interface in accordance with the present invention.

When in the keyframing mode, it becomes desirable to indicate to the user that he is setting key frames with nearly every edit that he does. This is preferably accomplished by providing an indicator in context with the edit to notify the user that a key frame for the edit which he just performed has been recorded. This indicator also gives the user a button which can be selected to cancel the key frame that had just been set or to choose other options for interpreting the change just made. This on-object user interface is provided in the context of the change, so, with respect to FIG. 5, if the user drags an object 510 in the scene 500 changing its position, the UI 520 will appear in the scene. For example, if the user changes the color of the object in the color picking UI, the on-object user interface is popped up over the color editor. An on-object UI indicates when changes done in the rest of the authoring tool UI are being recorded by the animation system. When a property is changed during keyframing, there is desirably a visual indicator that indicates that a key frame was changed. Items that can be changed include x, y, height, width, color, rotation, skew, for example.

There are two separate ways of interacting with objects in the scene, one which is animation focused, and one which is layout focused. In "animate" mode, the user is specifically focused on creating key frames for animations. Changes that the user makes to properties will be automatically recorded as key frames in an animation of those properties. In "layout" mode, the user's changes will be interpreted as changes to the non-animated values of properties where possible.

One exemplary way of segmenting the set of possible properties on an element is to break them into composing and non-composing properties. Composing properties are properties which can be meaningfully composed through simple operations. For example, a float is a composing property value because it can be composed with another value by addition. Non-composing properties cannot be meaningfully composed by simple operations. For example, a color value is not a composing value because composing it through an operation such as addition would cause out of gamut conditions, and other undesired behavior.

A reason to distinguish between these two types of properties is that, when they are animated, composing properties can be meaningfully changed in layout mode, while non-composing properties cannot. For example, if the user has an animation on the top property of an element (whose value is a float) and then the user moves that element in layout mode, then that change can be meaningfully composed with the animation (the element will now animate from its current position). More specifically, the animation that the user specified on the top property is relative to the current top value on the element. This is possible because the top property has a value that is composing (the animation engine takes the original position of the element, and adds the value output by the animation to get the current, animated position of the element). Thus, when the user moves the element in layout mode, the base value for the top property is updated, and the animation engine will automatically pick up the change, and animate from the new position of the element.

When the user changes an animated, non-composing property in layout mode, the system desirably indicates that that change cannot be meaningfully incorporated with the property. For example, either the user forgot that he is in layout mode, and meant to create a key frame at the current time, or the user had something else in mind such as changing the base value of that property. In this case, the user will be preferably warned that the new value cannot be incorporated into the current animation without creating a key frame. Additionally, a marker is desirably added to the timeline to indicate where this action will happen, and the value will desirably be visible in the scene. If the user enters animate mode, then the values will be converted into key frame values. If the user seeks the timeline, then the new values that he added will be lost, as they will be overridden by the animation.

A compound key frame is meant to represent the state of the object to which it belongs at the time where it is set on the timeline. However, in order to maintain an efficient representation of animations, only the changes to properties that affect animation are desirably stored, and represented in the user interface.

In animate mode, a user may select, for example, to add a new key frame, add a shape, change a property, or change a selection. If a new key frame is to be added, then the process set forth above with respect to FIG. 4 may be implemented, and further examples are given below (e.g., with respect to FIG. 9). If the user desires to add a shape at a time later than 0, then the base value for opacity is preferably set to 0, and a key frame is added at the current time, setting the opacity to 1.

If the user chooses to change a property, then it is determined whether a key frame exists for this property at the current time. If so, then the key frame value at the current time is modified accordingly. If a key frame does not exist for this property at the current time, then a new attribute key frame is created (see, e.g., FIG. 8).

If the user chooses to change a selection, it is determined whether the current selection has compound key frames. If so, the selection is changed accordingly. If not, then a compound key frame is created at the current time.

According to aspects of an embodiment, in layout mode, the user may convert temporary key frames to actual key frames or generate temporary key frames. For example, if a user changes a property, then, if the property is composing, the base value for the property is desirably modified such that the property value meets the edited value at the current time. If the property is not composing, and if the property is animated, then the temporary key frames are shown. However, if the property is not composing, and is not animated, then the property value is desirably updated and the process returns to the start state for layout mode.

Alternatively to the temporary key frames, a user interface could provide a user with the option to edit base values (e.g., by selecting a "none" tab in the user interface), or set animation key frames (e.g., by selecting a timeline tab). In such an embodiment (when the user is on the "none" tab), the current time is not active (i.e., not set to a particular value), and animation mode is not active. It is noted that in a specific timeline's tab, the current time and animation mode are both active.

An exemplary system begins in the layout mode. Before any animations are present, the user is likely going to arrange controls on the form as desired for the static layout of his UI. When the user presses the animate button, he desirably enters animate mode where key frames are automatically created for values that he changes. In this mode, the add new key frame button is desirably available.

An example of animation creation is now described, with respect to FIGS. 6A-6F and FIG. 7. Assume the user wishes to create a simple animation that moves an oval from left to right over half a second, holds the oval still for half a second, and then moves the oval back to its original position. Initially, the oval is created (step 700) and placed at a position on the screen and given a start time (step 705). The animate mode is entered (step 710) by clicking on an animate button or making a similar type selection. A new compound key frame is created for the oval at the current time (step 715). For example, the start time for the animation is identified on the timeline at time=0.5, in FIG. 6A.

Figure 6A:
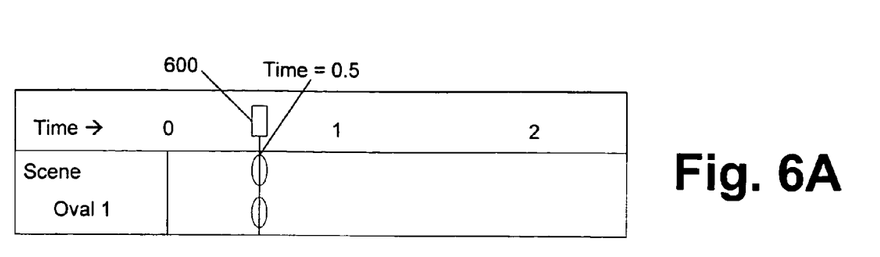
FIGS. 6A-6F are diagrams of exemplary timeline elements useful for illustrating a method of creating animation elements in accordance with the present invention.
Figure 6B:
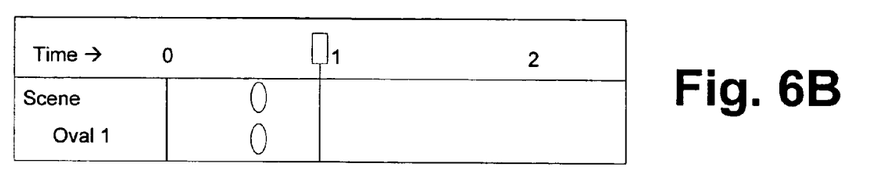
Figure 6C:
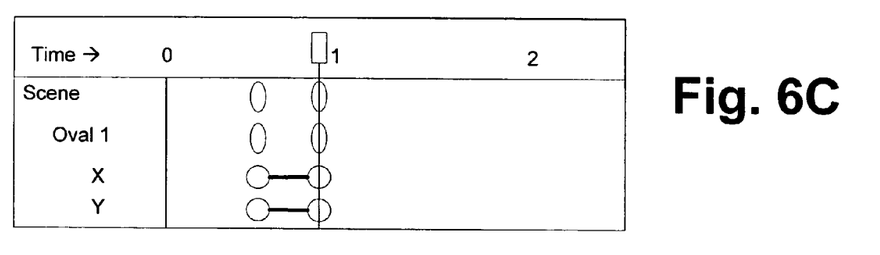
Figure 6D:
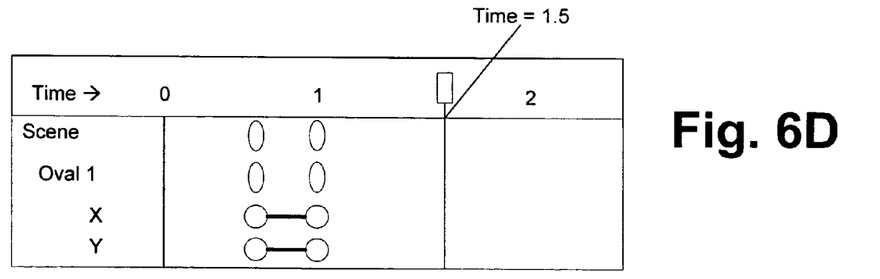
Figure 6E:
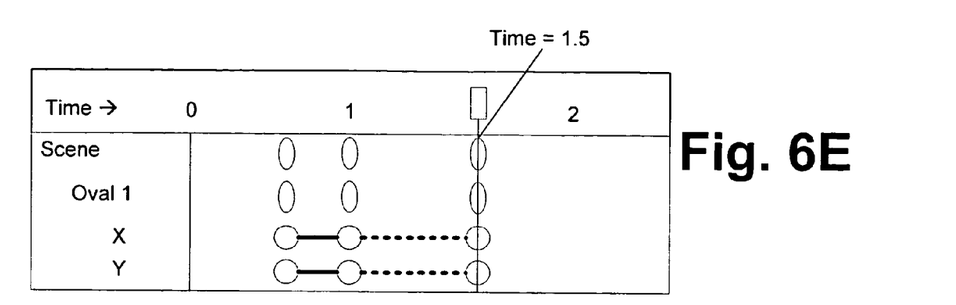

The playhead 600 is moved forward 0.5 seconds, as shown in FIG. 6B, to 1 second (step 720). Then, as shown in FIG. 6C, the position (e.g., X,Y position) of the oval is changed, and key frames are added at 1 second (step 725). Processing continued at step 720. The playhead 600 is moved forward another 0.5 seconds, from 1 second to 1.5 seconds, as shown in FIG. 6D, and a key frame is added (e.g., by a user activating an "add keyframe" button for example, on the UI), as shown in FIG. 6E, to specify that the oval should keep its position between 1 and 1.5 seconds.

Figure 6F:
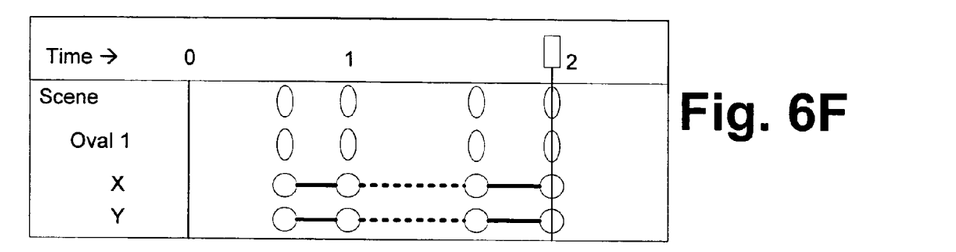
Figure 7:
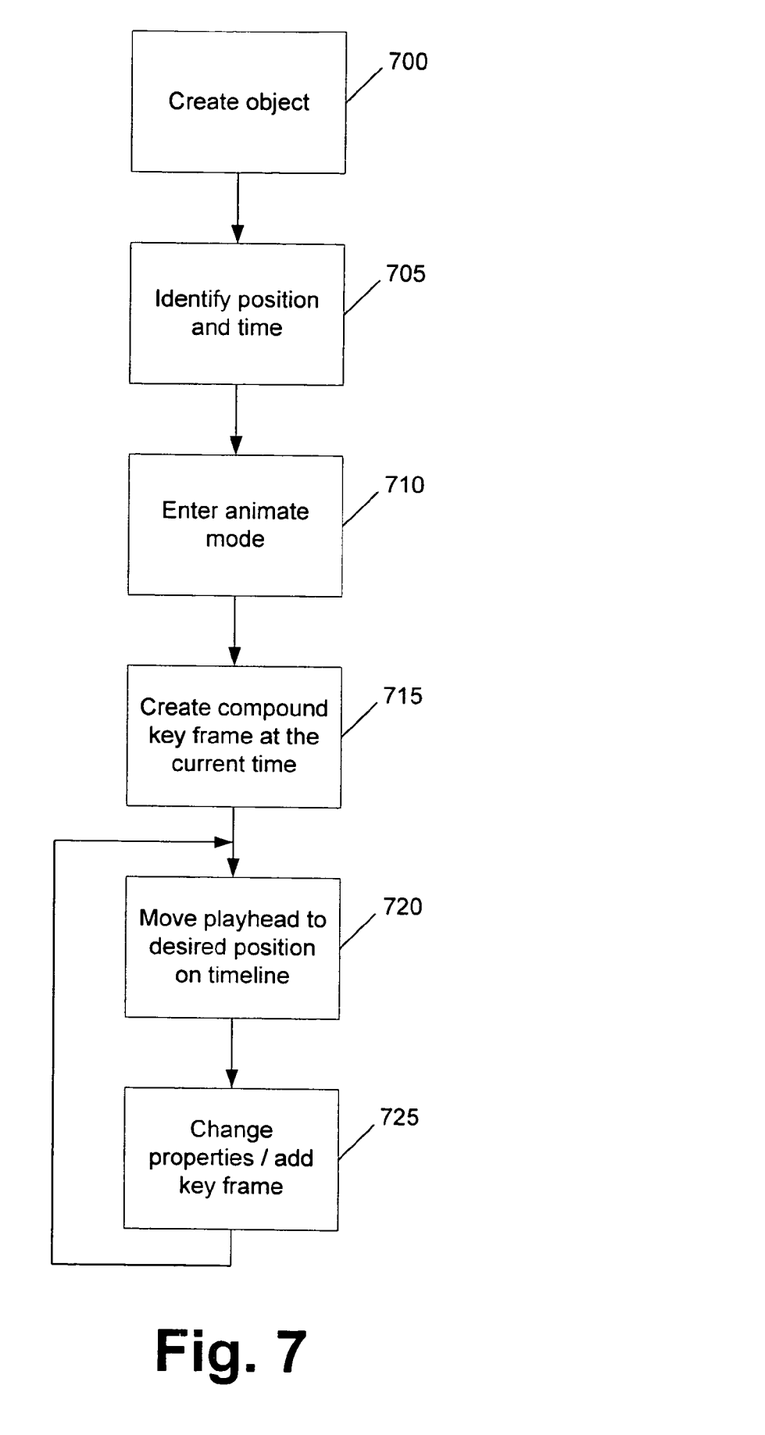
FIG. 7 is a flow diagram of an exemplary process of creating animation elements in accordance with the present invention.

The playhead 600 is then moved forward another 0.5 seconds, to time=2, at the position of the oval is changed back to its starting point and a key frame is added accordingly, as shown in FIG. 6F. At this point, the user has created the desired animation, and can exit animate mode to change the layout of the scene without creating key frames, or stay in animate mode to keyframe additional animations.

If a user is in animate mode, the user may add and adjust the key frames at the current point in time as he adjusts the objects attributes using the object handles and palettes. For each attribute the user changes at a given time, an attribute key frame is added. Compound key frames on the object are also taken into account to preserve their meaning. Moreover, desirably, when the user changes a property and there is an attribute key frame for that property at the current time, then that attribute key frame is edited. Otherwise, when the user changes a property there is not an attribute key frame for that property at the current time, there are several cases as set forth below, examples of which are described with respect to FIGS. 8A-8H.

Figures 8A, 8B:
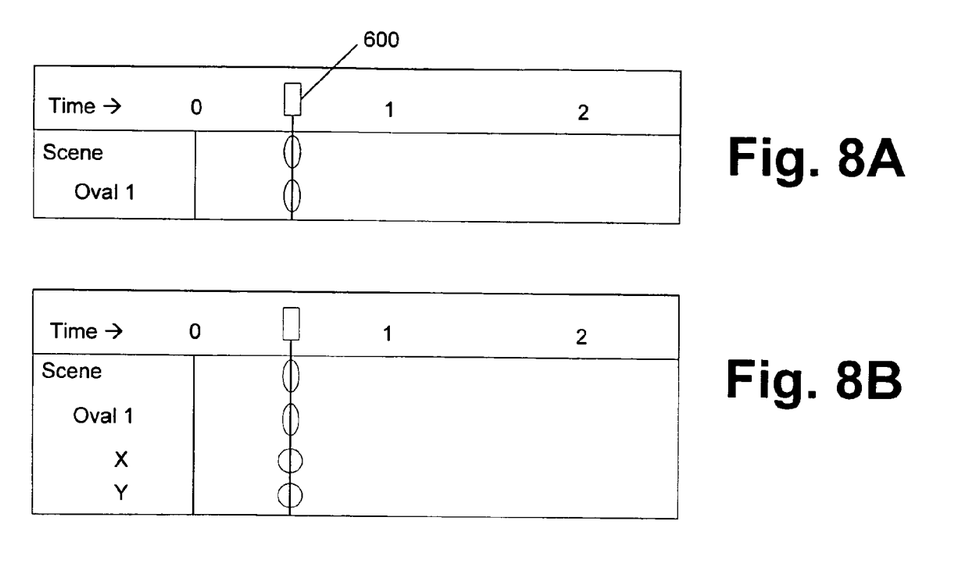
FIGS. 8A-8H are diagrams of exemplary timeline elements useful for illustrating exemplary auto-adding key frame scenarios in accordance with the present invention.

If the playhead 600 is on the only compound key frame on the element, as shown in FIG. 8A, then an attribute key frame is added for the new value at the current time, as shown in FIG. 8B.

Figure 8C:
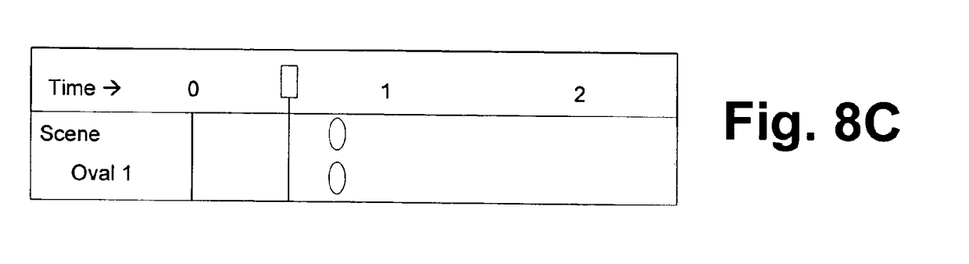
Figure 8D:
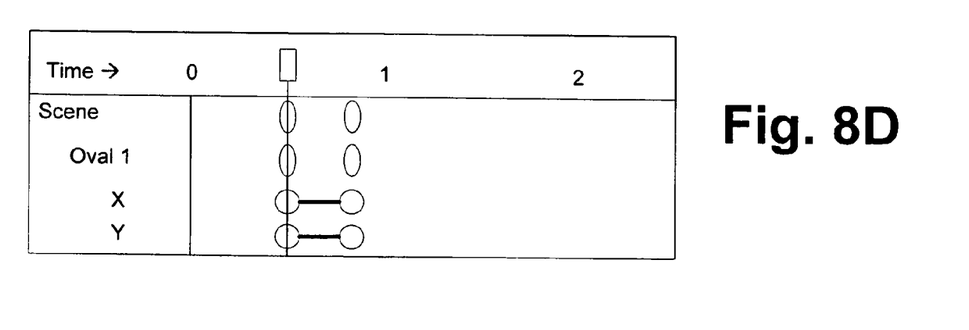

If the playhead 600 is before all compound key frames on the element, as shown in FIG. 8C, then, in this case, if the next compound key frame does not have an attribute key frame for the changed property, then it is populated with the old value of the property. An attribute key frame is also created at current time with the new value, as shown in FIG. 8D.

Figure 8E:
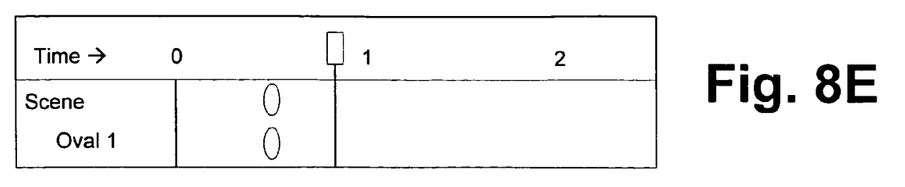
Figure 8F:
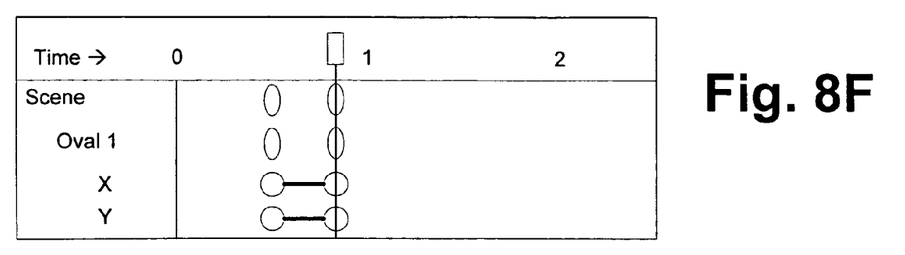

If the playhead 600 is disposed after all compound key frames on the element, as shown in FIG. 8E, then, in this case, if the previous compound key frame does not have an attribute key frame for the changed property, then it is populated with the old value of the property. An attribute key frame is also created at current time with the new value, as shown in FIG. 8F.

Figure 8G:
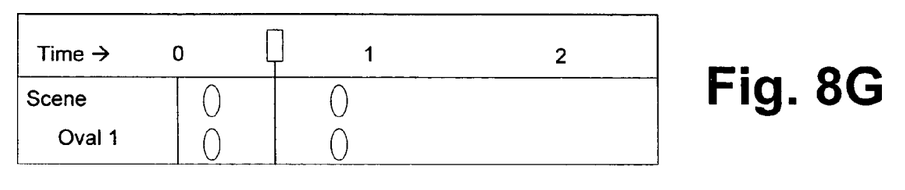
Figure 8H:
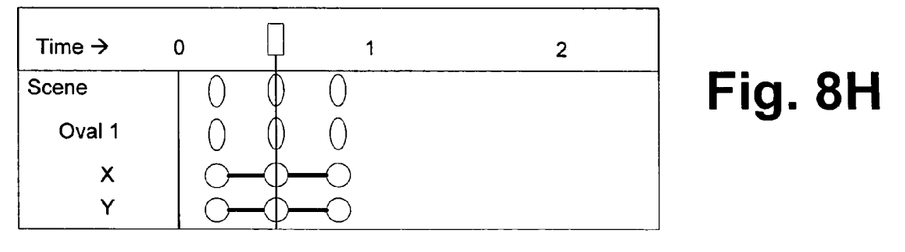

If the playhead 600 is disposed between two compound key frames on the element, as shown in FIG. 8G, then in this case, both the compound key frame before current time, and the compound key frame after current time are checked. If either does not have an attribute key frame for the changed property, then it is populated with the old value of the property. An attribute key frame is also created at current time with the new value, as shown in FIG. 8H. It is noted that the base value will not necessarily be used if there are attribute key frames specified at any time beyond the compound key frames (e.g., similar to that set forth above with respect to step 435 in FIG. 4).

An exemplary pre-condition to the examples described with respect to FIGS. 8A-8H is that the auto key frame button is desirably activated. A desirable post-condition is that changes that the user makes to attributes are recorded as attribute key frames. Parameters of the examples described with respect to FIGS. 8A-8H are as follows. Times and values of attributes are desirably set while in auto-keyframing mode. If there was not a compound key frame at the current time, then one is desirably created and provided to parents of this element to represent the new attribute key frame. If properties were not previously visible, then they are provided for the user to see. It is contemplated that this exemplary parameter can be disabled as an option.

It is desirable that a compound key frame can be added to an element at the current time to preserve state while creating an animation. Hold key frames can be created with this functionality. It is contemplated that an exemplary UI would comprise an add key frame button that is enabled when in keyframing/animate mode. A user would desirably select a "add compound key frame" button or selector and a new compound key frame is added and populated at the current time. If there is already a compound key frame at current time, then no change would be made.

Figure 9A:
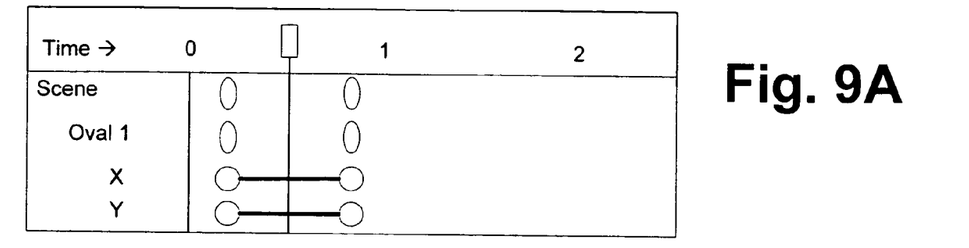
FIGS. 9A and 9B are diagrams of exemplary timeline elements useful for illustrating exemplary compound key frame scenarios in accordance with the present invention.
Figure 9B:
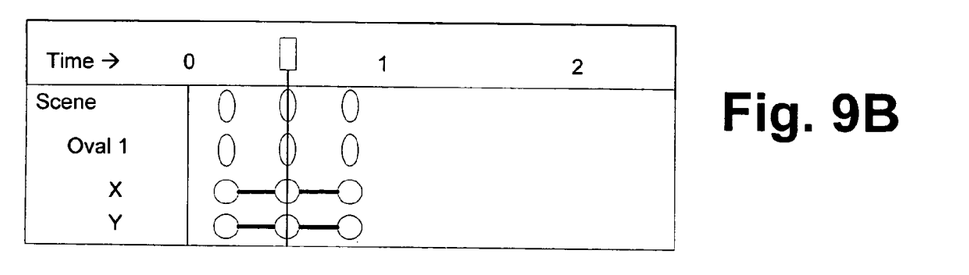

To populate a compound key frame, for each property that is currently animated on the element to which the compound key frame is being added (as shown in FIG. 9A), the system desirably adds an attribute key frame comprising the current, animated value of the property. The new exemplary compound key frame is shown in FIG. 9B. The new compound key frame is desirably populated with the current values of all animations at current time. Note that the user did not have to change a value to create this compound key frame.

An exemplary pre-condition to the compound key frame creation, is that the user seeks to the time at which he wants to set the key frame. For example, the user may select "Timeline->Add Key frame" on the UI or press the add key frame button on the timeline element.

A user may explicitly add attribute key frames. This may be desirable if the user would like a key frame with the same value as the current key frame. In such a case, in an exemplary UI, the user would scroll the current time to the desired time for the key frame, move the mouse over the timeline area for the desired time, and press the set key frame button. Alternatively, for example, the user may be provided with an option to select "add key frame" in a pull-down menu. A new attribute key frame is thus added to the attribute at the current time.

Thus, it is contemplated that an exemplary UI can maintain user preferences for attribute key frame times across edits to attribute key frame values. Moreover, exemplary user interfaces allow for the creation of both object level and attribute level key frames, populate attribute key frame values based on surrounding object key frames, and do not require the explicit creation of key frames for a particular object or attribute.

It is further contemplated that the present invention can be used with two dimensional transformations as well as three dimensional transformations, but should not be limited to just these types of transformations.

Exemplary Computing Environment

Figure 10:
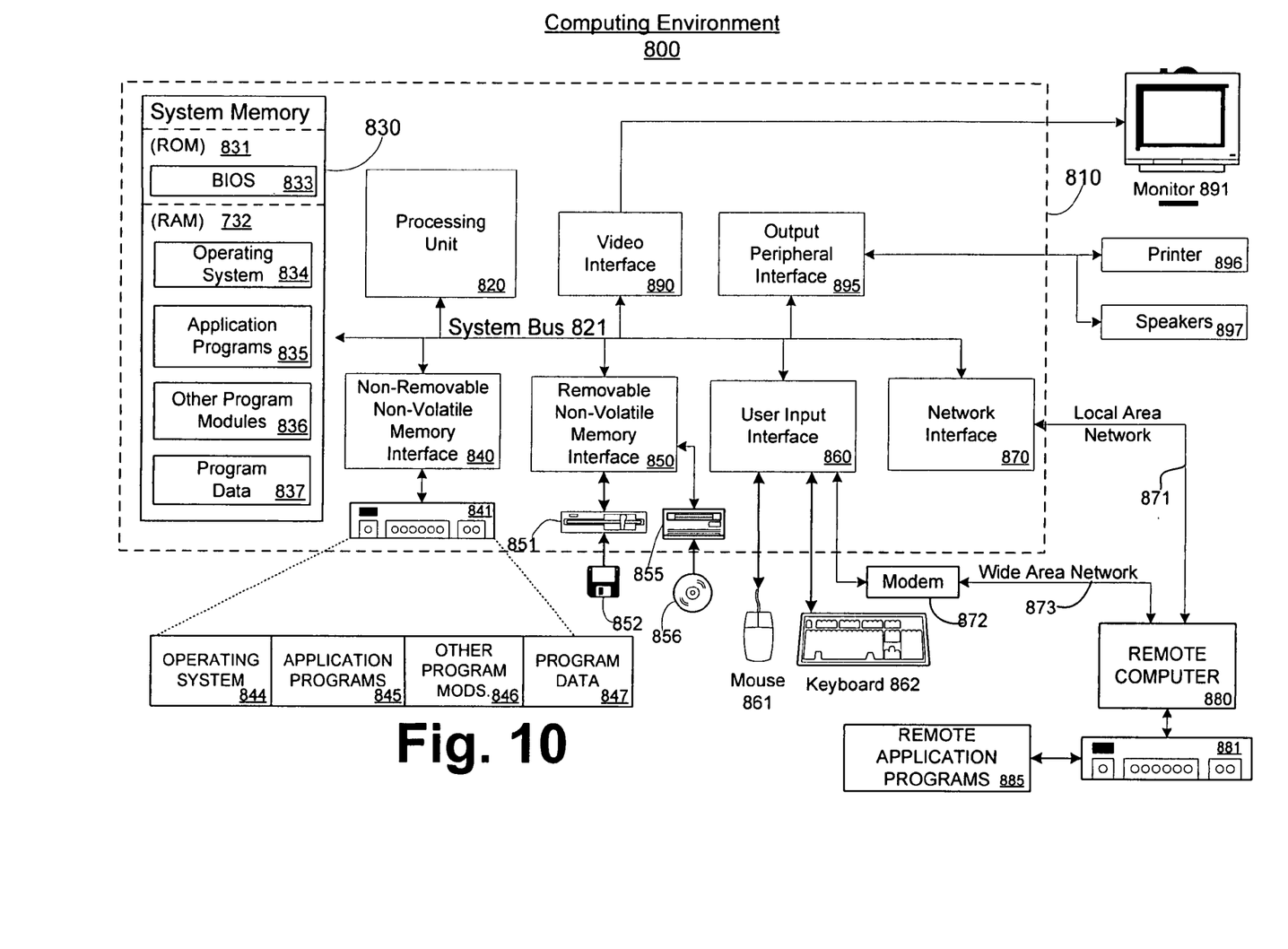
FIG. 10 is a block diagram showing an exemplary computing environment in which aspects of the invention may be implemented.

FIG. 10 illustrates an example of a suitable computing system environment 800 in which the invention may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or non-volatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable, volatile/non-volatile computer storage media. By way of example only, FIG. 10 illustrates a hard disk drive 840 that reads from or writes to non-removable, non-volatile magnetic media, a magnetic disk drive 851 that reads from or writes to a removable, non-volatile magnetic disk 852, and an optical disk drive 855 that reads from or writes to a removable, non-volatile optical disk 856, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 10. The logical connections depicted include a LAN 871 and a WAN 873, but may also include other networks. Such networking environments are commonplace in offices, enterprise-wide computer networks, intranets and the internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on memory device 881. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A processor-implemented method of keyframing an animation object in an animation implemented at least in part by a computer, the animation including one or more displayed layers, each layer including one or more displayed objects, each object being described by a plurality of properties / attributes ('properties'), the method comprising:

identifying, via the processor, at least one property and a time for the object;

creating a first compound key frame at the time;

receiving a second time for the object;

creating a second compound key frame at the second time;

receiving a change to the at least one property prior to creating the second compound key frame, the second compound key frame incorporating the change to the at least one property; and performing one of:

creating an attribute key frame responsive to the received change to the at least one property if no attribute key frame exists for the at least one property at the time the received change is received, and changing an existing attribute key frame responsive to the received change to the at least one property if the existing attribute key frame exists at the time the received change is received, where each attribute key frame is instantiated from a first predetermined type of key frame implemented at a level corresponding to the properties of the object and specific to the at least one property of the object and each compound key frame is instantiated from a second predetermined type of key frame implemented at a level corresponding to the object and specific to all possible properties of the object, and where a compound key frame is initially set in a timeline to represent all of the properties of a corresponding object when the corresponding object first appears in the animation, and an attribute key frame is subsequently set in the timeline to represent a change to a particular property of the corresponding object when the corresponding object experiences the change in the animation.

2. The method of claim 1, further comprising receiving additional times for the object and creating associated compound key frames at each of the additional times.

3. The method of claim 1, wherein receiving the second time for the object comprises moving a playhead to a position on a timeline in a user interface, the position corresponding to the second time.

4. The method of claim 1, further comprising entering an animate mode prior to creating the first compound key frame.

5. The method of claim 1, wherein each of the first and second compound key frames represents the state of the at least one property on the object at the associated time.

6. A computer system having a graphical user interface including a display and a user interface selection device, the computer system configured to perform a method of keyframing an animation object of an animation via a timeline element on the display, the animation including one or more displayed layers, each layer including one or more displayed objects, each object being described by a plurality of properties / attributes ('properties'), the method comprising:

receiving a selection signal indicative of the user interface selection device selecting at least one property and a time for the object;

displaying a first compound key frame at the time on the timeline element;

receiving a selection signal indicative of the user interface selection device selecting a second time for the object;

displaying a second compound key frame at the second time on the timeline element;

receiving a selection signal indicative of the user interface selection device selecting a change to the at least one property prior to displaying the second compound key frame, the second compound key frame incorporating the change to the at least one property; and performing one of:

displaying an attribute key frame responsive to the received change to the at least one property on the timeline element if no attribute key frame exists for the at least one property at the time the received change is received, and changing an existing displayed attribute key frame responsive to the received change to the at least one property if the existing displayed attribute key frame exists at the time the received change is received, where each attribute key frame is instantiated from a first predetermined type of key frame implemented at a level corresponding to the properties of the object and specific to the at least one property of the object and each compound key frame is instantiated from a second predetermined type of key frame implemented at a level corresponding to the object and specific to all possible properties of the object, and where a compound key frame is initially set in a timeline to represent all of the properties of a corresponding object when the corresponding object first appears in the animation, and an attribute key frame is subsequently set in the timeline to represent a change to a particular property of the corresponding object when the corresponding object experiences the change in the animation.

7. The computer system of claim 6, configured to receive additional selection signals indicative of the user interface selection device selecting additional times for the object, and display associated compound key frames at each of the additional times on the timeline element.

8. The computer system of claim 6, wherein receiving the selection signal indicative of the user interface selection device selecting a second time for the object comprises receiving an execution signal indicative of a user moving a playhead to a position on a timeline in the timeline element, the position corresponding to the second time.

9. The computer system of claim 6, configured to receive an execution signal indicative of a user selecting an animate mode prior to displaying the first compound key frame.

* * * * *